(12) United States Patent
Coble et al.

(10) Patent No.: US 7,419,204 B2
(45) Date of Patent: Sep. 2, 2008

(54) POWERED RAMP DOOR LIFT

(76) Inventors: John R. Coble, 10055 Idle Pine La., Benita Springs, FL (US) 34135; Dallis A. Lindley, 52361 Swanson Dr., South Bend, IN (US) 46635; William B. Leftwich, 2100 E. Bristol - Apt. 6-225, Elkhardt, IN (US) 46514

( * ) Notice: Subject to any disclaimer, the term of this patent is extended or adjusted under 35 U.S.C. 154(b) by 18 days.

(21) Appl. No.: 11/208,293

(22) Filed: Aug. 19, 2005

(65) Prior Publication Data

US 2007/0040405 A1 Feb. 22, 2007

(51) Int. Cl.
*B62D 33/03* (2006.01)
(52) U.S. Cl. .................. 296/57.1; 296/146.9
(58) Field of Classification Search ............ 296/61, 296/62, 57.1, 146.9, 158; 292/DIG. 72; 49/498.1; 14/69.5, 71.3, 71.5
See application file for complete search history.

(56) References Cited

U.S. PATENT DOCUMENTS 5,573,091 A * 11/1996 Hung ................ 192/12 R
5,768,828 A   6/1998 Wilson
6,135,532 A * 10/2000 Martin .................. 296/61
6,421,962 B2 * 7/2002 McNamara ............. 52/64
6,959,848 B2 * 11/2005 Schmeichel ............ 226/50

* cited by examiner

Primary Examiner—D Glenn Dayoan
Assistant Examiner—Melissa A Black
(74) Attorney, Agent, or Firm—R. Tracy Crump

(57) ABSTRACT

The powered ramp door lift is used in cargo trailers and other ramp door applications and includes a powered winch assembly, a pair of wire cables or nylon straps connecting the winch assembly to the ramp door, and a "pusher" mechanism. The winch assembly mounted to the trailer header winds and unwinds the cables onto a pair of spools mounted to a drive shaft, which is driven by an electric motor. The "pusher" mechanism prevents the "unspooling" problems that effect the operation of winches in automated ramp door applications. The pusher mechanism engages the ramp door in the closed position and applies an outward force to the ramp door over a small portion of its travel to assist in the initial lowering of the ramp door from the closed position. The winch assembly also includes a cable tension winch shut off mechanism, which deactivates the winch motor in the absence of any tension on cables.

25 Claims, 19 Drawing Sheets

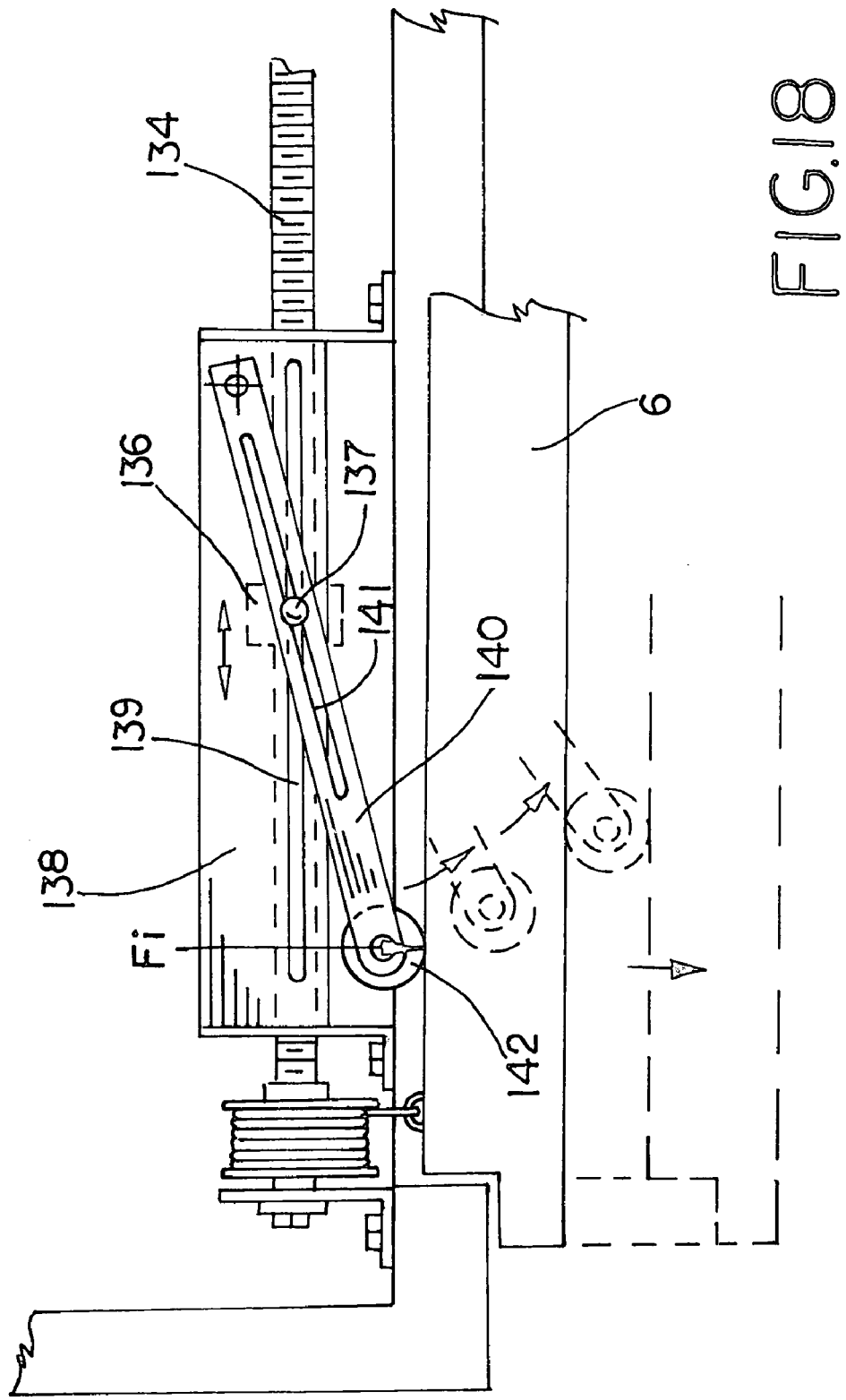

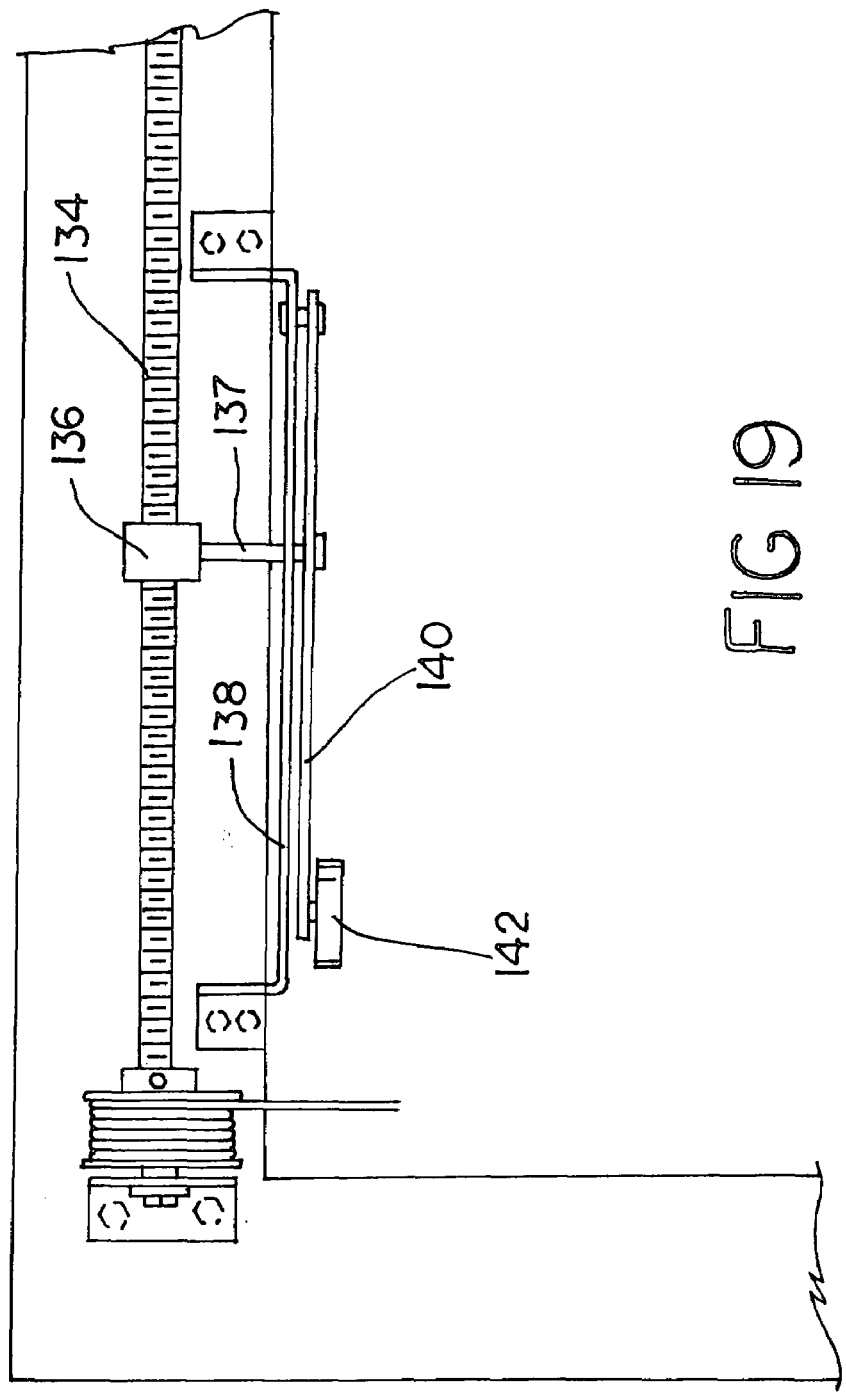

POWERED RAMP DOOR LIFT

This invention relates to a powered ramp door lift for use in cargo trailers and other ramp door applications.

BACKGROUND OF THE INVENTION

Vertically pivoting ramp doors are common features on cargo trailers, as well as, various types of recreational vehicles and enclosures. Ramp doors are hinged to cargo trailers to allow the ramp doors to swing from a vertical closed position where the ramp door encloses the door opening to an open position where the ramp door contacts the ground, thereby providing a ramp for access to the trailer interior. Powered ramp door lifts used to automatically raise and lower the ramp doors are a highly desirable feature, particularly for applications with large heavy ramp doors. Typically, powered ramp door lifts consist of one or more cables connected to the ramp door and a simple cable winch mounted within the trailer interior. While, simple cable winches winding a single cable can be used to lift the ramp doors in a ramp door application, two cables are needed to ensure that the ramp door remains level as it moves between the open and closed position and prevent the twisting of the ramp door under its own weight.

Heretofore, conventional powered lifts have been used in cargo trailers and other applications with limited success. One of the major drawbacks of conventional lifts in ramp door applications has been the tendency of the cables to "unspool" from the webs of the winch spool in the absence of cable tension from the winch. When two cables are used to support the ramp door, the tension on each cable is often unequal. This difference in tension may be the product of a variety of practical factors, including: the difference in the length of cable wound around each spool, differences in the amount of cable stretch, variances in the outer diameters of the spools and/or the manner in which each cable is wound onto the spools. Any differences in cable tension between the two cables results in a slack cable, which leads to unspooling problems. Consequently, greater care must be taken to install dual cable powered lifts to ensure little difference in the cable tension between the two cables.

In addition, when the ramp door is in the vertical closed position, the weight of the door rests directly over the door hinge, such that the force of gravity acting on the door in the vertical plane is substantially opposite the supportive force of the hinge. Due to the mass of the ramp door and its static rotational inertia in the vertical closed position, the ramp door tends to remain at rest as the winch begins to unwind the cables. While cable tension provided by the winch holds the ramp door in the vertical closed position, if the ramp door does not immediately begin to lower with the unwinding of the winch, cable tension is lost. In the absence of cable tension, the resilient memory of the cables will cause the cables to "unspool" and become tangled or bound in the winch apparatus. Users often must pull on the closed ramp door to over come the initial rotational inertia of the door as the winch unwinds the cable. To pull the ramp door open, the user must often be positioned under the lowering ramp door, which creates a potentially hazardous situation. Conventional powered ramp door lifts using simple cable winches, like torsion spring counterbalances that are used to unweight the ramp doors in manually lifted ramp door applications, only exert a force on the door through the cables to pull the door closed. In the vertical closed position, the force applied to the ramp door by the lift is inward. Consequently, a powered ramp door lift that provides a small outward force to the ramp door to maintain cable tension during the initial travel of the ramp door from the closed position is needed to ensure consistent and instantaneous operation of the lift in raising and lowering the ramp doors between the closed and open positions.

SUMMARY OF THE INVENTION

The present invention seeks to provide a powered ramp door lift for a cargo trailer and other ramp door applications. Each of the different powered ramp door lifts embodying the teachings of this invention includes a powered winch assembly, a pair of wire cables or nylon straps connecting the winch assembly to the ramp door, and a "pusher" mechanism. The winch assembly mounted to the trailer header winds and unwinds the cables onto a pair of spools mounted to a drive shaft, which is driven by an electric motor. The "pusher" mechanism prevents the "unspooling" problems that effect the operation of winches in automated ramp door applications. The pusher mechanism engages the ramp door in the closed position and applies an outward force to the ramp door over a small portion of its travel to assist in the initial lowering of the ramp door from the closed position. This outward force is used to overcome the rotational inertia of the ramp door in its vertical closed position, which allows the ramp door to lower as the cable or strap is unwound from the winch. The winch assembly also includes a cable tension winch shut off mechanism, which deactivates the winch motor in the absence of any tension on the cables or straps.

Accordingly, the powered ramp door lifts embodying this invention demonstrate several advantages over existing lift systems in cargo trailer and other ramp door applications and ensure consistent and instantaneous operation of the winch assembly in raising and lowering the ramp doors between the closed and open positions. The winch assemblies have simple compact designs, which allow them to be readily mounted to any conventional trailer header. The winch assemblies can also combine a torsion spring counterbalance with an electric winch assembly to increase the lifting power of the electrical winch motor. Electrical controls of the lifts are located on the trailer or can be used remotely so that the user may raise and lower the ramp door while standing at a safe distance from the ramp door. The cable tension winch shut off mechanism helps eliminate the cable unspooling problem by automatically deactivating the winch motor once the ramp door contacts the ground in the open position or fails to open when physically locked in the closed position or is obstructed by a foreign object.

Theses and other advantages of the present invention will become apparent from the following description of an embodiment of the invention with reference to the accompanying drawings.

BRIEF DESCRIPTION OF THE DRAWINGS

The drawings illustrate an embodiment of the present invention, in which:

FIG. 18 is a partial top view of the fifth embodiment of the pusher mechanism of FIG. 17; and FIG. 19 is a partial side view of fifth embodiment of the pusher mechanism of FIG. 19.

DESCRIPTION OF THE PREFERRED EMBODIMENT

Figure 1:
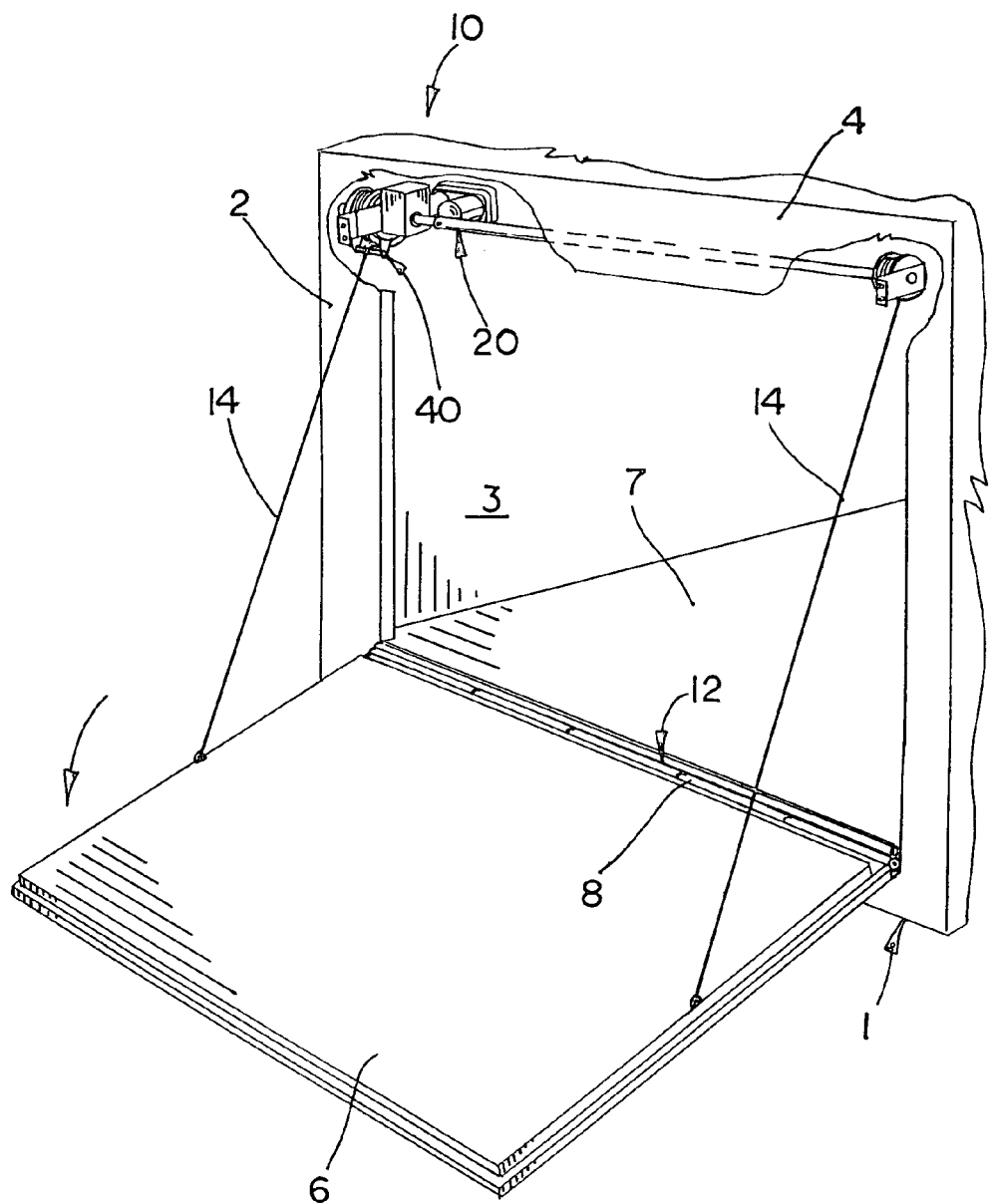
FIG. 1 is a perspective view of one embodiment of the ramp door lift of this invention used in a ramp door cargo trailer showing the ramp door in the open position with portions of the trailer cutaway.

The powered ramp door lifts embodying the teaching of this invention are designed and intended for use in cargo trailers and other ramp door applications. The powered ramp door lifts raise and lower ramp doors between their open and closed positions. For simplicity of explanation, each embodiment of the powered ramp door lifts is illustrated in the drawings and described herein in a conventional cargo trailer application, although the teaching of this invention can be employed into other ramp door applications. As shown, cargo trailer 1 is of conventional design and includes an end wall 2 having a door opening 3 and a ramp door 6. A hinge 8 pivotally connects the lower edge of ramp door 6 to the trailer floor 7 at the bottom of the door opening 3 which allows the ramp door to swing between a vertical closed position where the door encloses the door opening and an open position in which the upper edge of the ramp door rests on the ground. As shown, ramp door 6 includes a plurality of contact bumpers 9 to prevent damage to the door and trailer end wall when the ramp door contacts the ground in the open position or the trailer end wall in the closed position.

Each embodiment of the ramp door lifts include a powered winch assembly, a pair of wire cables or nylon straps connecting the winch assembly to the ramp door, and a "pusher" mechanism. The winch assembly is mounted to the trailer header 4 and winds and unwinds the cables onto a pair of spools mounted to a drive shaft, which is driven by an electric motor. It should be understood that the winch assembly components, as well as, their operative arrangement, may vary within the scope of the teaching of this invention and are not limited to any particular embodiment illustrated in the drawings or described herein.

The "pusher" mechanism prevents the "unspooling" problems that effect the operation of winches in automated ramp door applications and ensures consistent and instantaneous operation of the winch assembly in raising and lowering the ramp doors between the closed and open positions. The pusher mechanism exerts a small outward force ($F_i$) on the door when the door is in its closed position to move the door way from the end wall an "initial assisted opening displacement ($d_i$)" at which point the weight of the ramp door swings the ramp door to its open position lowered by the winch assembly. This initial assisted opening distance ($d_i$) necessary depends on the size and weight of the ramp door, but for most conventional ramp door applications in cargo trailers is approximately 4-18 inches, which represents only about 5-15 degrees of rotational travel. This initial outward force $F_i$ is used to overcome the rotational inertia of the ramp door in its vertical closed position, which allows the ramp door to lower as the cable or strap is unwound from the winch. The "pusher" mechanism may take a variety of physical embodiments within the scope of this invention. In each embodiment, however, the pusher mechanism operatively engages the ramp door in the closed position and applies the initial outward force $F_i$ to the ramp door over a small portion of its travel to assist in the initial lowering of the ramp door from the closed position. The initial outward force can be applied to the ramp door at any point above the hinge to create the impulse moment, which begins to open the ramp door.

FIGS. 1-9 illustrate one embodiment of the powered ramp door lift of this invention, which is generally designated as reference numeral 10. Ramp door lift 10 includes a "pusher" mechanism 12 and a winch assembly 20. Pusher mechanism 12 is a length of rubber air hose or a similar resilient material. As shown, the length of air hose is secured to either ramp door 6 or the edge of trailer floor 7 and positioned so that the hose is longitudinally compressed between the trailer floor and the ramp door when the ramp door is in its closed position.

Figure 2:
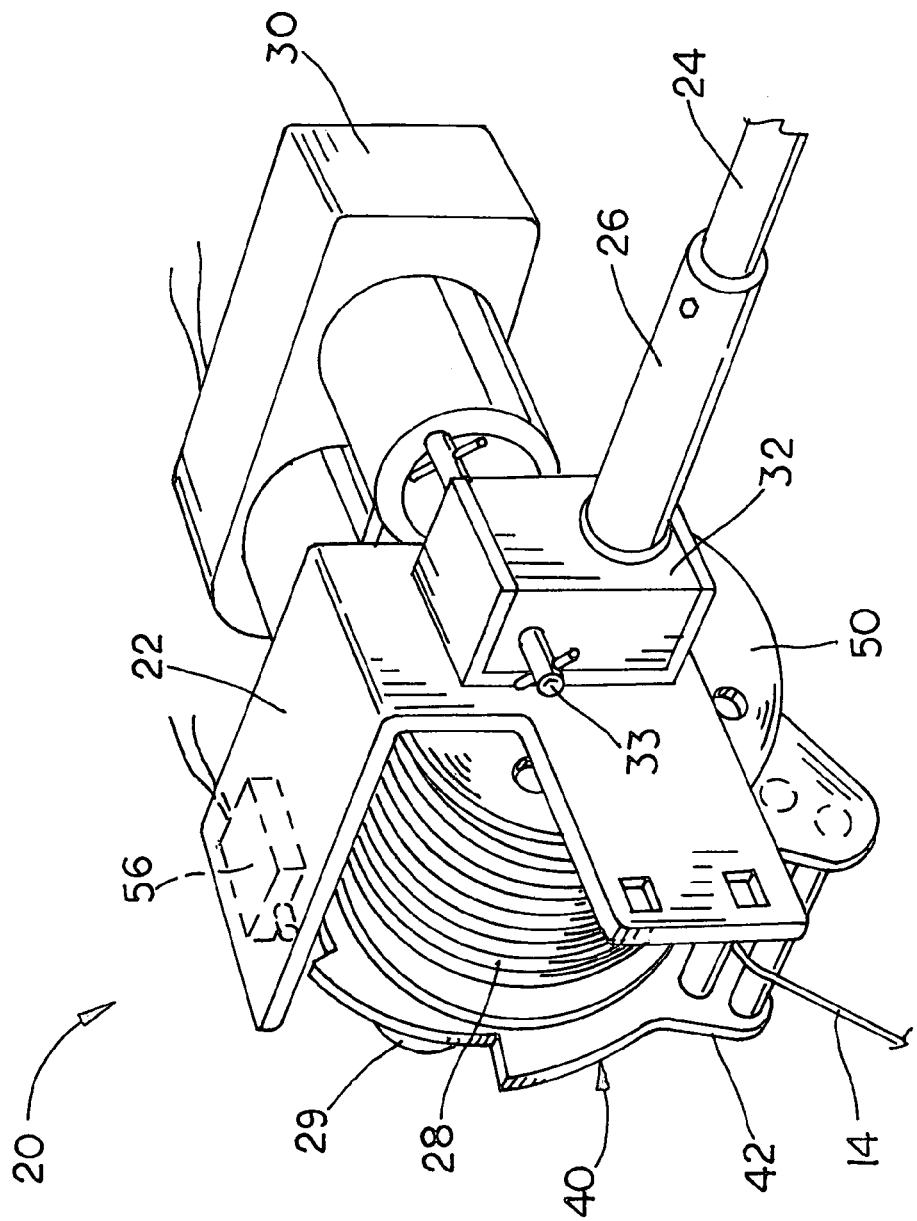
FIG. 2 is a partial perspective view of the winch assembly of the ramp door lift of FIG. 1.
Figure 3:
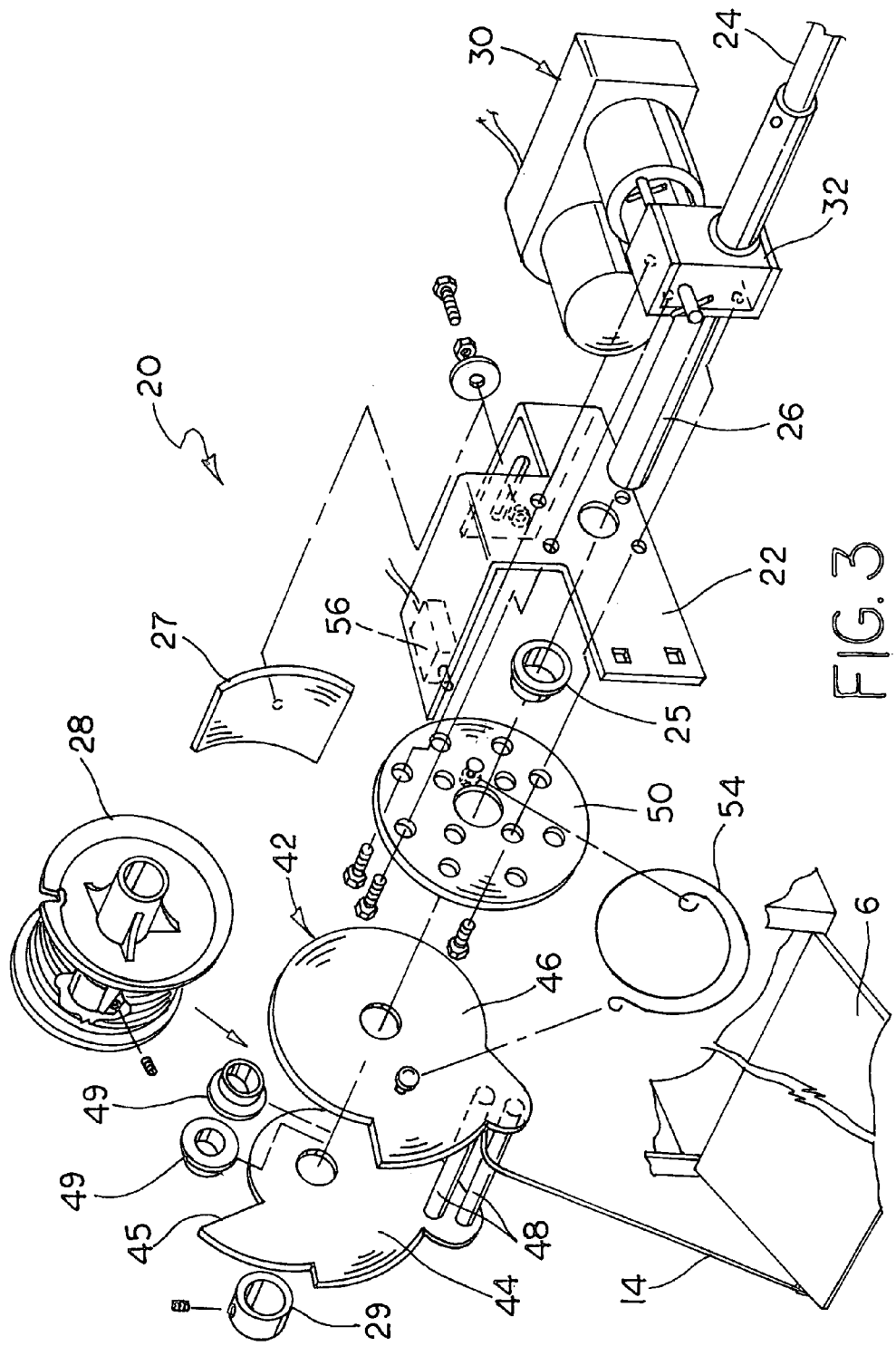
FIG. 3 is an exploded view of the winch assembly of the ramp door lift of FIG. 2.
Figure 4:
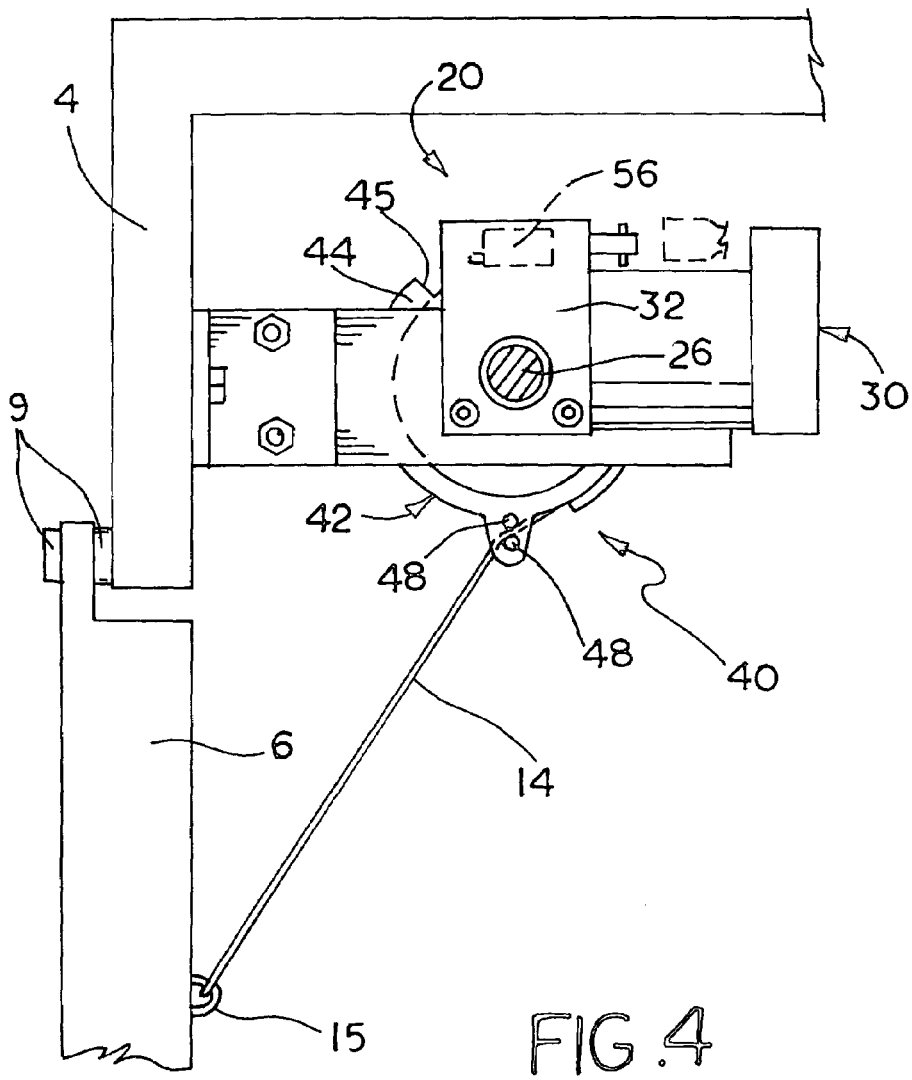
FIG. 4 is a side view of the winch assembly of the ramp door lift of FIG. 2 showing cable tension winch shut off mechanism with the cable under tension.

Winch assembly 20 is mounted to the inside of trailer header 4 and supported by mounted brackets 22 and 23 and traverses substantially the entire width of door opening 3. Winch assembly 20 includes an electrical winch motor 30 and gear box 32, an elongated drive shaft 24, a pair of cable spools 28. Wire cables 14 connect the upper edge of ramp door 6 to winch assembly 20. Cables 14 are attached to eyelets 15 fixed to ramp door 6. As best shown in FIGS. 2 and 3, a tubular shaft extension 26 is coaxially fitted to the ends of drive shaft 24. Shaft extensions 26 extend through bushings 25 seated in central bores in mounting brackets 22 and 23. Spools 28 are coaxially secured to each shaft extension 26. Each cable 14 is wound onto one of spools 28. An end cap 29 is secured to the end of each shaft extension 26. Cable guides 27 is adjustably bolted to the back flange of mounting brackets 22 and 23 (shown in FIG. 3 for mounting bracket 22 only). Cable guides 27 ensure that cables 14 wind onto spools 28 properly.

Figure 10:
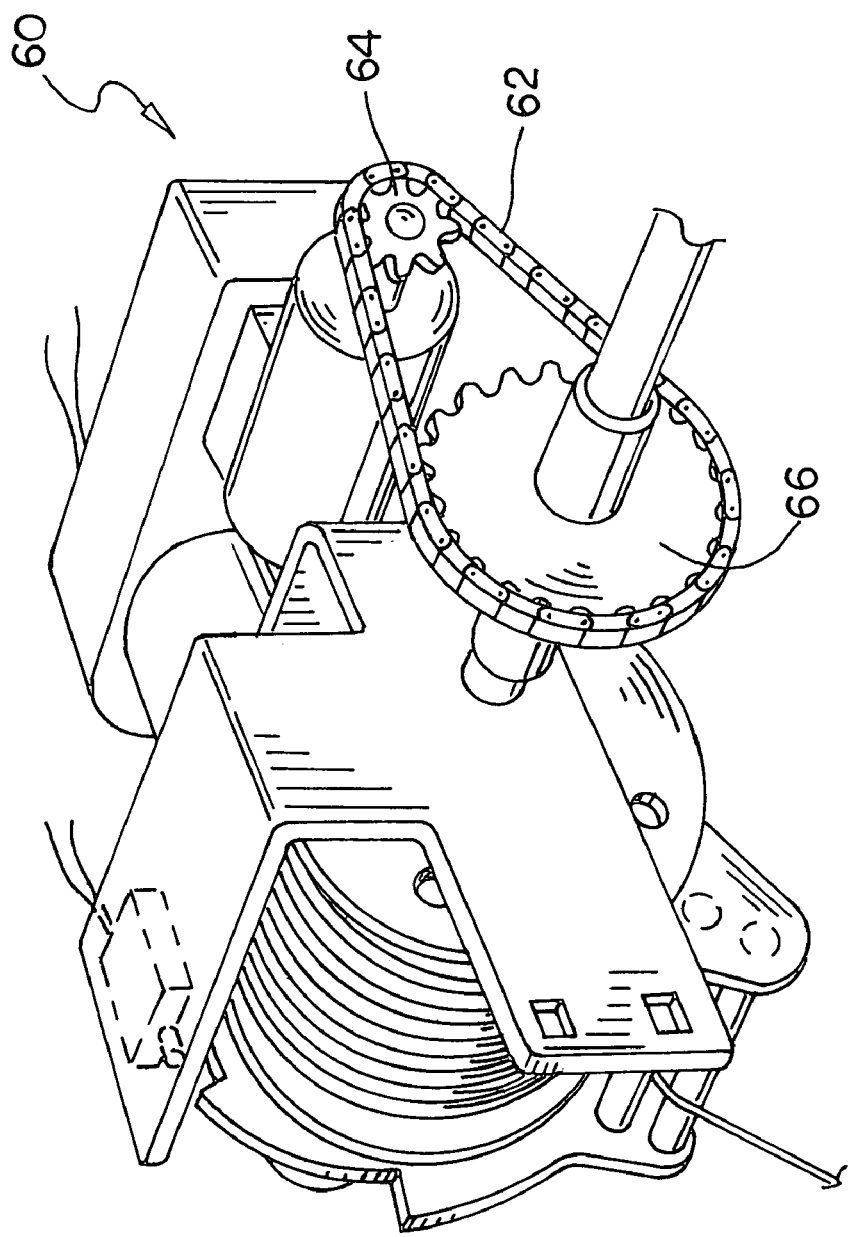
FIG. 10 is a partial perspective view of another embodiment of the winch assembly.

Winch motor 30 is mounted to and supported by mounting bracket 22 and operatively connected to the adjacent shaft extension 26 by a gear box 32. Gear box 32 also includes an axillary drive pin 33, which allows a user to operate the winch manually in the event of an electrical power failure. The teachings of this invention are not limited to the use of a gearbox to connect the winch motor to the drive shaft. Alternatively, winch motor 30 may be operatively connected to shaft extension and thereby drive shaft 24 by any suitable means, including belt drives, chain drives, screw drives, gears, sprockets and direct drive mechanisms. For example, FIG. 10 illustrates a simple chain driven winch assembly 60, where a link chain 62 and two sprockets 64 and 66 transfer rotation from the winch motor to the drive shaft.

It should be noted that winch motor 30 is a reversible electric motor, such as the ones available from Danaher Motion of Wood Dale, Ill. The horse power of the motor is selected to provide sufficient lifting power to move the ramp door between its open and closed positions. A reversible electrical motor allows the direction of the motor shaft rotation to be reversed by simply switching the polarity of the motor's electrical connections. Electrical wiring (not shown) connects the motor to the trailers electric power. Alternatively, winch motor 30 may be powered by its own electrical source, such as a battery pack or generator. The electrical wiring also includes a wired or wireless control switch or device, which allows the user to control the operation of the winch by switching polarity of the electrical current. Wired control switches and devices can be conveniently located on the interior and exterior of the trailer as desired and to allow the user to operate the lift while standing a safe distance from the ramp door. Similarly, wireless control switches and devices, such as radio frequency and infrared remote controllers, can be used for added user convenience. It should be noted that winch motor 30 has an internal locking mechanism or "brake" which prevents drive shaft 24 from rotating when winch motor 30 is deactivated. This internal brake contributes to the safety features of winch assembly 20.

Figure 8:
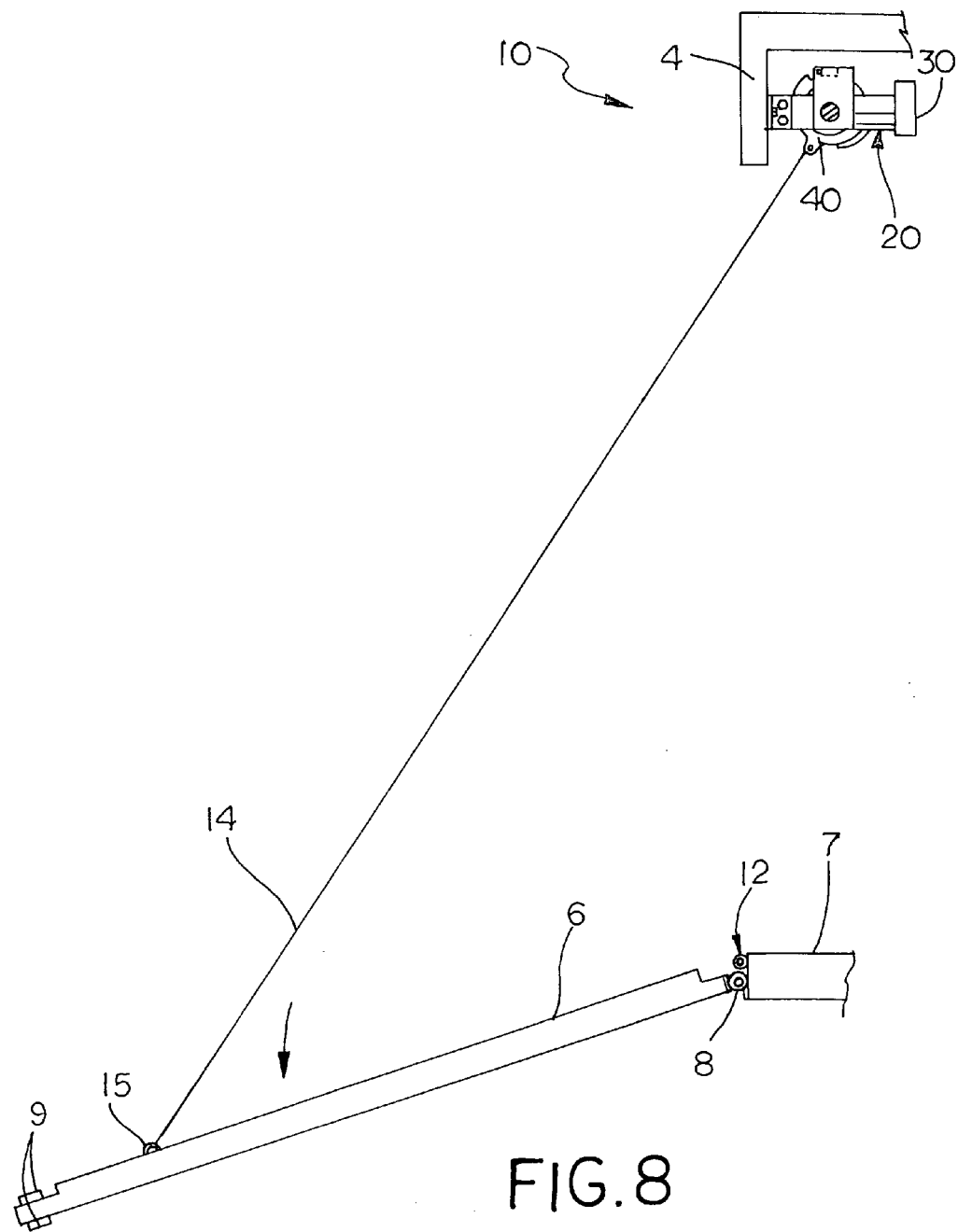
FIG. 8 is a simplified side view of the ramp door lift of FIG. 1 showing the ramp door in the open position.

FIGS. 6-9 illustrate the operation of ramp door lift 10. In operation, winch assembly 20 winds and unwinds cables 14 onto spools 28 to raise and lower ramp door 6 between its closed (FIG. 6) and open positions (FIG. 8). In the closed position, pusher 12 is compressed between ramp door 6 and the edge of trailer floor 7. The compression force on pusher 12 is created by the cable tension exerted by the winch motor 30. In the close position, ramp door 6 compresses pusher 12 only a few millimeters. When compressed, the memory of the resilient material and tubular construction of pusher 12 exerts an outward force on ramp door 6. When winch assembly 20 unwinds cables 14, pusher 12 decompresses urging ramp door 6 outward away from trailer end wall 2. Pusher 12 continues to decompress until the upper edge of ramp door 6 is approximately 4.0-18.0 inches from trailer end wall 2. At this point in the ramp door's travel, the weight of ramp door 6 under the influence of gravity alone allows the ramp door to move to its open position lowered by winch assembly 10.

One skilled in the art will note several advantages of pusher 12. Pusher 12 is located adjacent hinge 8 between ramp door 6 and edge of the trailer floor 7. The location of pusher 12 is unobtrusive and allows for a clean uncluttered trailer end wall. In addition, locating pusher 12 along the lower edge of the ramp door, reduces the distance that the pusher must engage the ramp door in order to achieve the necessary initial forced travel of the ramp door. While compressed only a few millimeters, the compression distance of the pusher is sufficient to produce the necessary travel of the upper end of ramp door * to keep the cables taut as the winch assembly unwinds the cables before gravity alone acts to keep the cables taut as the ramp door lowers. The use of a length of resilient tubing allows the "pusher" forces to be applied uniformly across the width of the ramp door, which eliminates the need for contact plates and other structural concerns in ramp doors.

Figure 5:
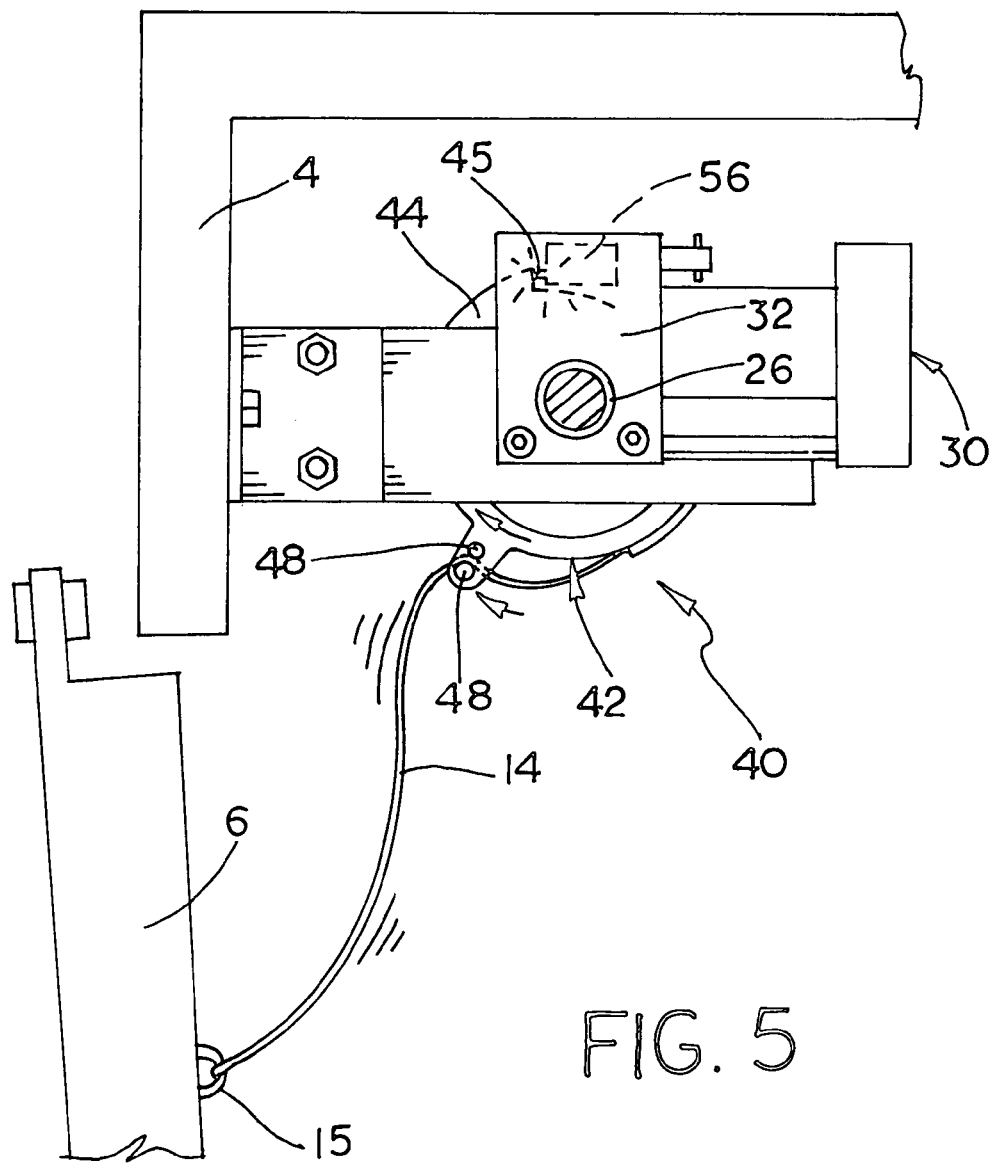
FIG. 5 is a side view of the winch assembly of the ramp door lift of FIG. 2 showing cable tension winch shut off mechanism with the cable slack.
Figure 6:
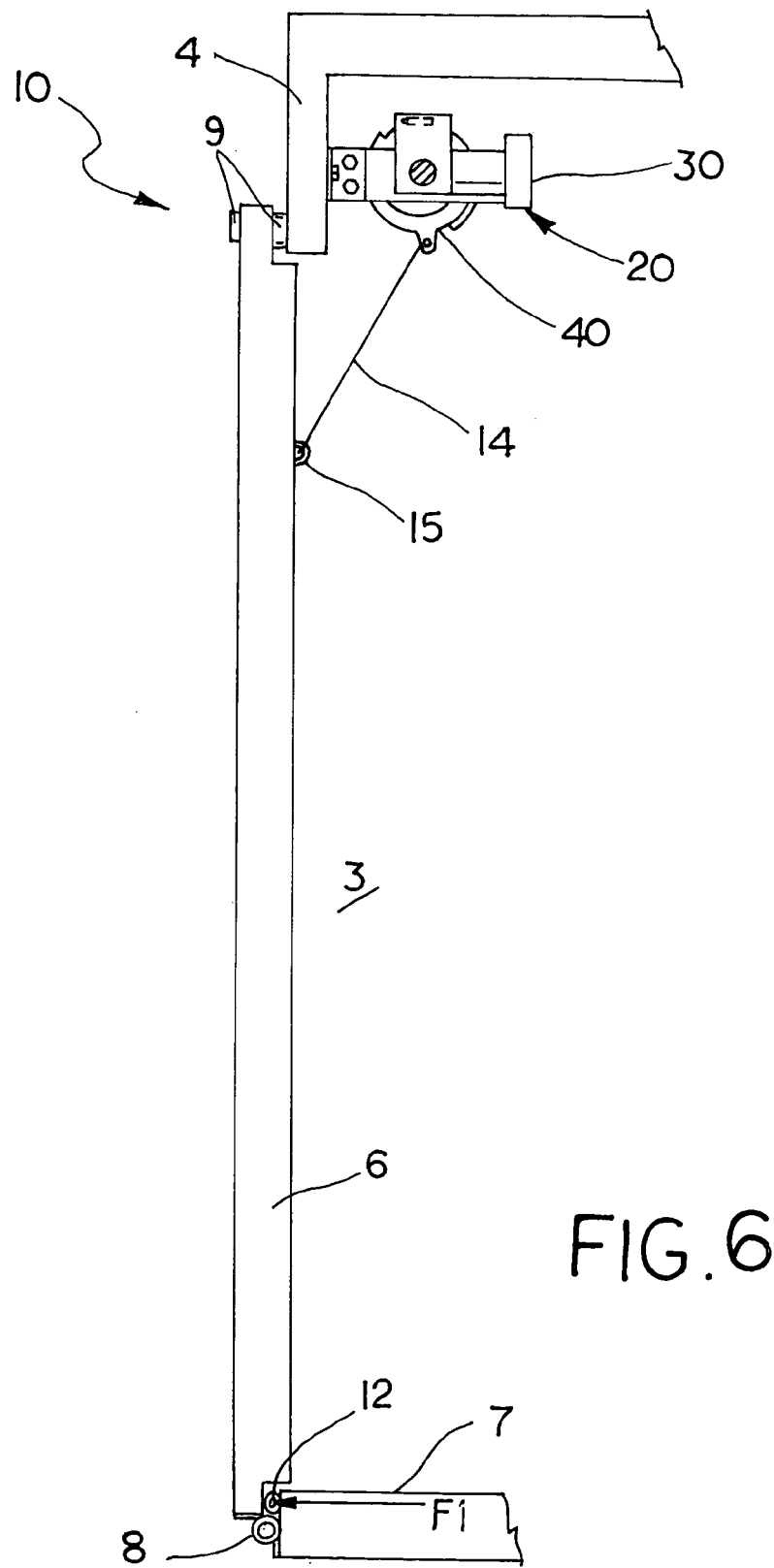
FIG. 6 is a simplified side view of the ramp door lift of FIG. 1 showing the ramp door in the closed position.
Figure 7:
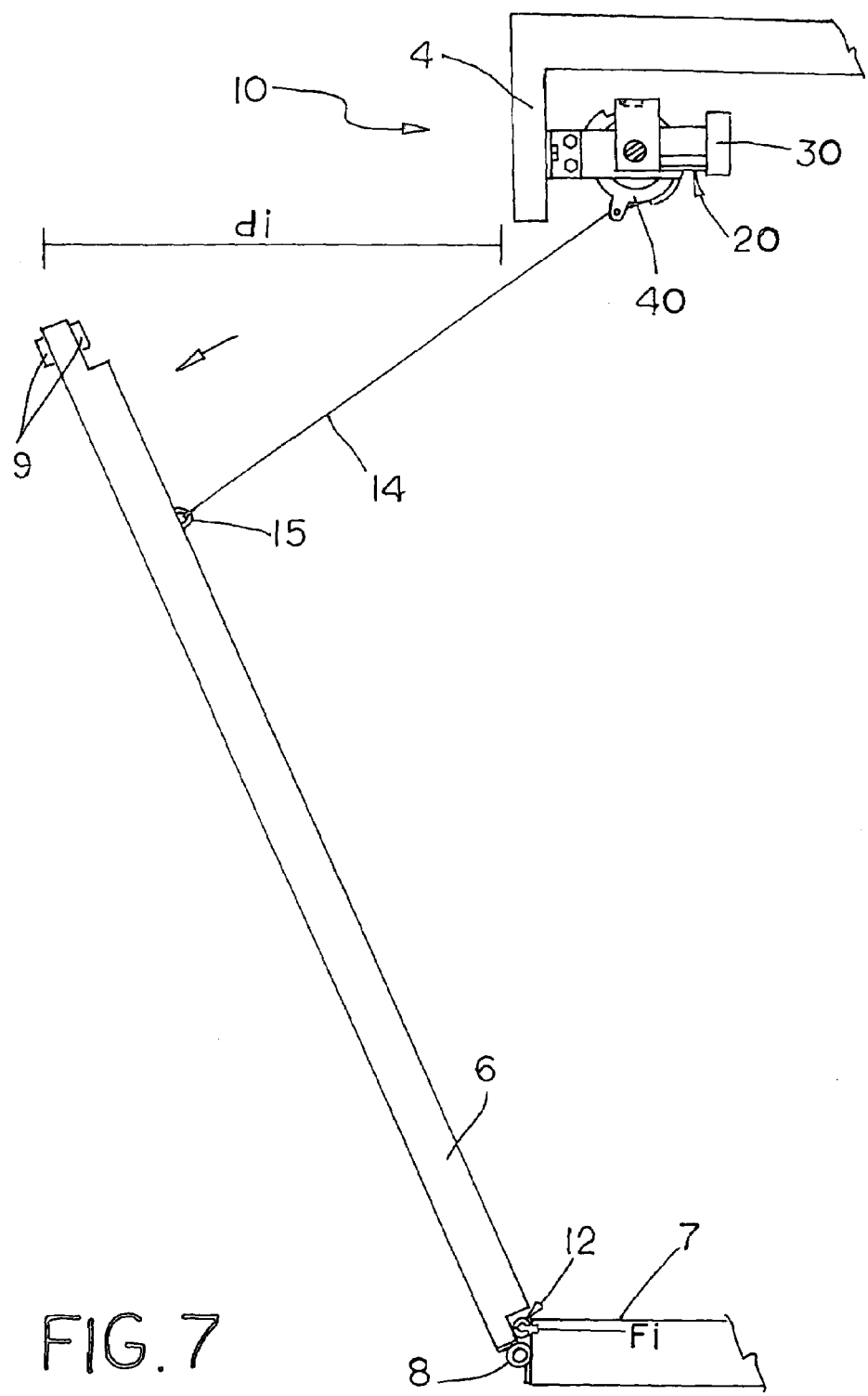
FIG. 7 is a simplified side view of the ramp door lift of FIG. 1 showing the ramp door opening from the closed position.
Figure 9:
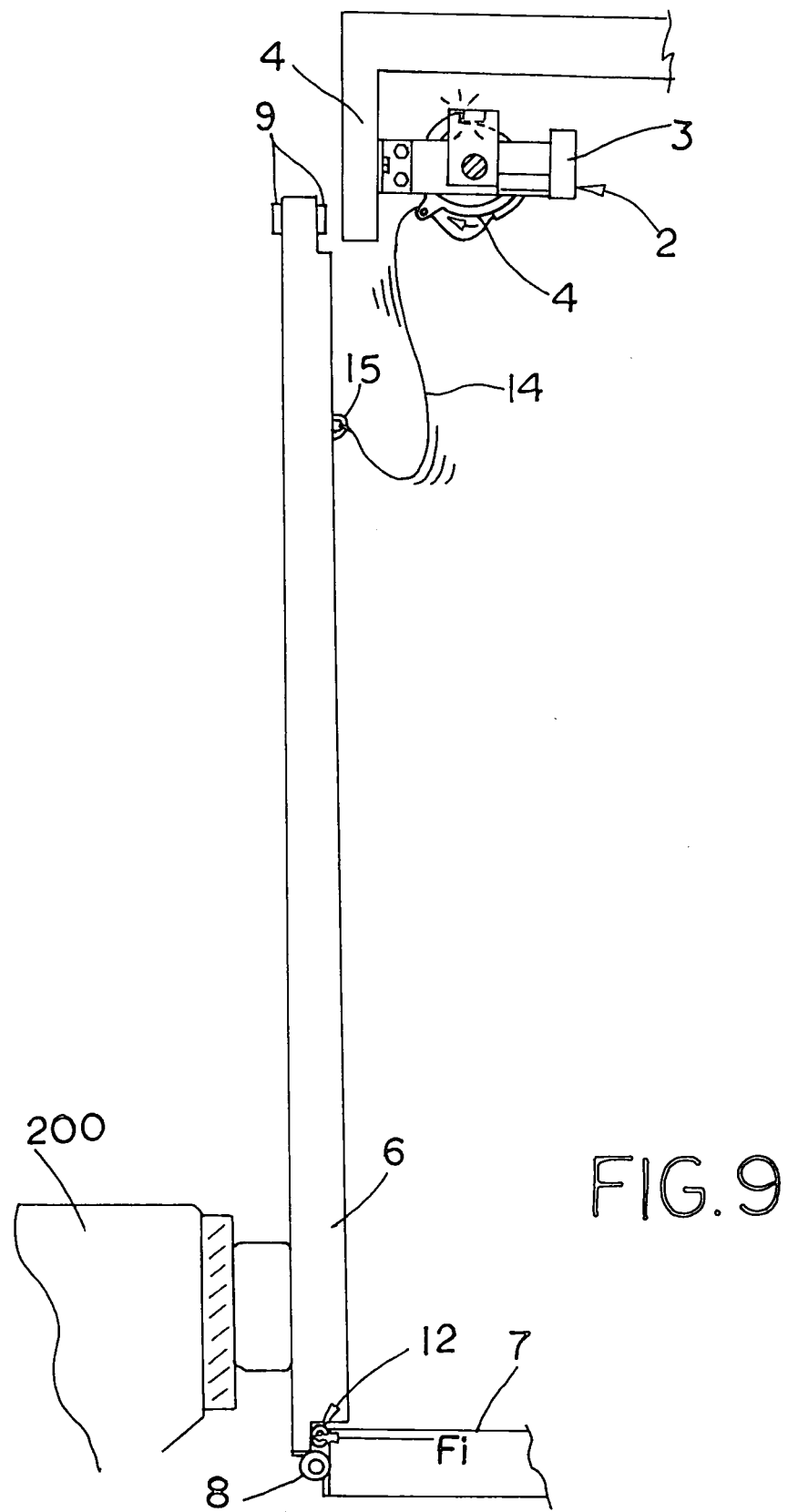
FIG. 9 is a simplified side view of the ramp door lift of FIG. 1 showing the ramp door in the closed position with cables slack.

Winch assembly 20 also includes a cable tension winch shut off mechanism (referred to herein as a "tension kill mechanism") 40, which deactivates winch motor 30 in the absence of any tension on cables 14. Tension kill mechanism 40 includes a spring loaded carriage 42, and an electrical trip switch 56. As shown, carriage 42 includes a pair of end plates 44 and 46 and two bail arms 48, which extend transversely between plates 44 and 46. Shaft extension 26 extends through bushings 49 seated in central bores in each carriage end plate 44 and 46 with the adjacent spool 28 interposed between the carriage plates. Cable 14 extend from spool 28 and pass between bail arms 48. A fixed index plate 50 is bolted to mounting bracket 22 with shaft extension 26 extending through a central bore therein. Carriage 42 is biased by a coiled wire spring 54. The ends of wire spring are hooked and seated to spring studs 47 and 51 extending from carriage end plate 46 and index plate 50, respectively. The radial position of bail arms 48 with respect to shaft extension 26 and the bias of carriage 42 can be selectively adjusted by repositioning the radial orientation of indexing plate 50 to mounting bracket 22. Indexing plates 50 have a plurality of mounting bores 53, which allow the indexing plate to be bolted to mounting bracket 22 in various positions to adjust the radial orientation of spring stud 51, thereby adjusting the position of bail arms 48 and the carriage tension. Trip switch 56 is illustrated as a simple electrical contact switch wired to winch motor 30, although any suitable control switch or device may be employed within the scope of this invention. Trip switch 56 is secured to the bottom of the top flange of mounting plate 22 and suspended over carriage end plate 44. Carriage end plate 44 has a contact edge 45. As shown in FIGS. 5 and 9, when carriage 42 rotates about shaft extension 26, contact edge 45 of carriage plate 46 engages trip switch 56 to deactivate winch motor 30.

FIGS. 4-9 illustrate how tension kill mechanism 40 also helps eliminate the cable unspooling problem. Tension kill mechanism 40 automatically deactivates winch motor 30 once ramp door 6 contacts the ground in the open position. Without tension kill mechanism 40, winch motor 30 would continue to unwind cables 14 once ramp door 6 contacts the ground until the user deactivates the winch motor. Delays in deactivating the winch motor once the ramp door contacts the ground creates slack in the cables, which can cause the cable to jump from the spools. Tension kill mechanism 40 also automatically deactivates the winch motor if the travel of the ramp door is inadvertently obstructed. For example, if the ramp door is physically locked in the closed position or obstructed by some foreign object, such as a dock floor 200 in FIG. 9, tension kill mechanism 40 prevents the user from activating the winch motor, which would unwind and unspool the cable without lowering the door.

Figure 11:
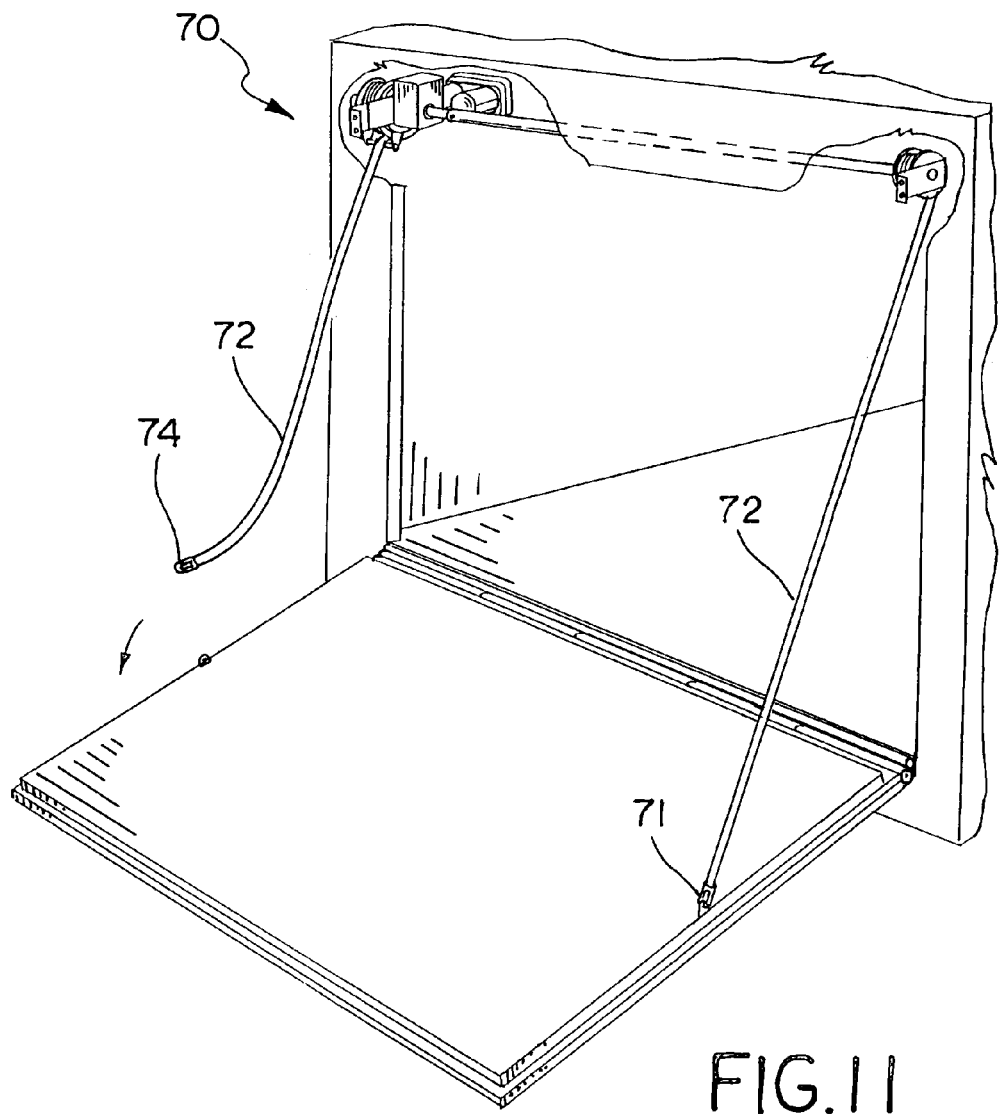
FIG. 11 is a perspective view of a second embodiment of the ramp door lift of this invention used in a ramp door cargo trailer showing the ramp door in the open position with portions of the trailer cutaway.

FIG. 11 illustrates another embodiment of the lift assembly of this invention, which is generally designated as reference numeral 70. Lift assembly 70 is similar to lift assembly 10 of FIGS. 1-9, except that the winch assembly uses detachable nylon straps 72 in place of wire cables. Straps 72 terminate in snap ring or locking carabiners 74, which fasten to eyelets 15 in ramp door 6. The winch assembly also includes spools 76 which are modified to accept straps 72. The use of detachable straps allows the straps to be disconnected from the ramp door when in the open position. Once detached from the ramp door, the straps can be wound onto the spools for storage. Because permanently fixed cables can be a tripping and safety hazard, disconnecting the straps improves the function and safety of the ramp door lift.

Figure 12:
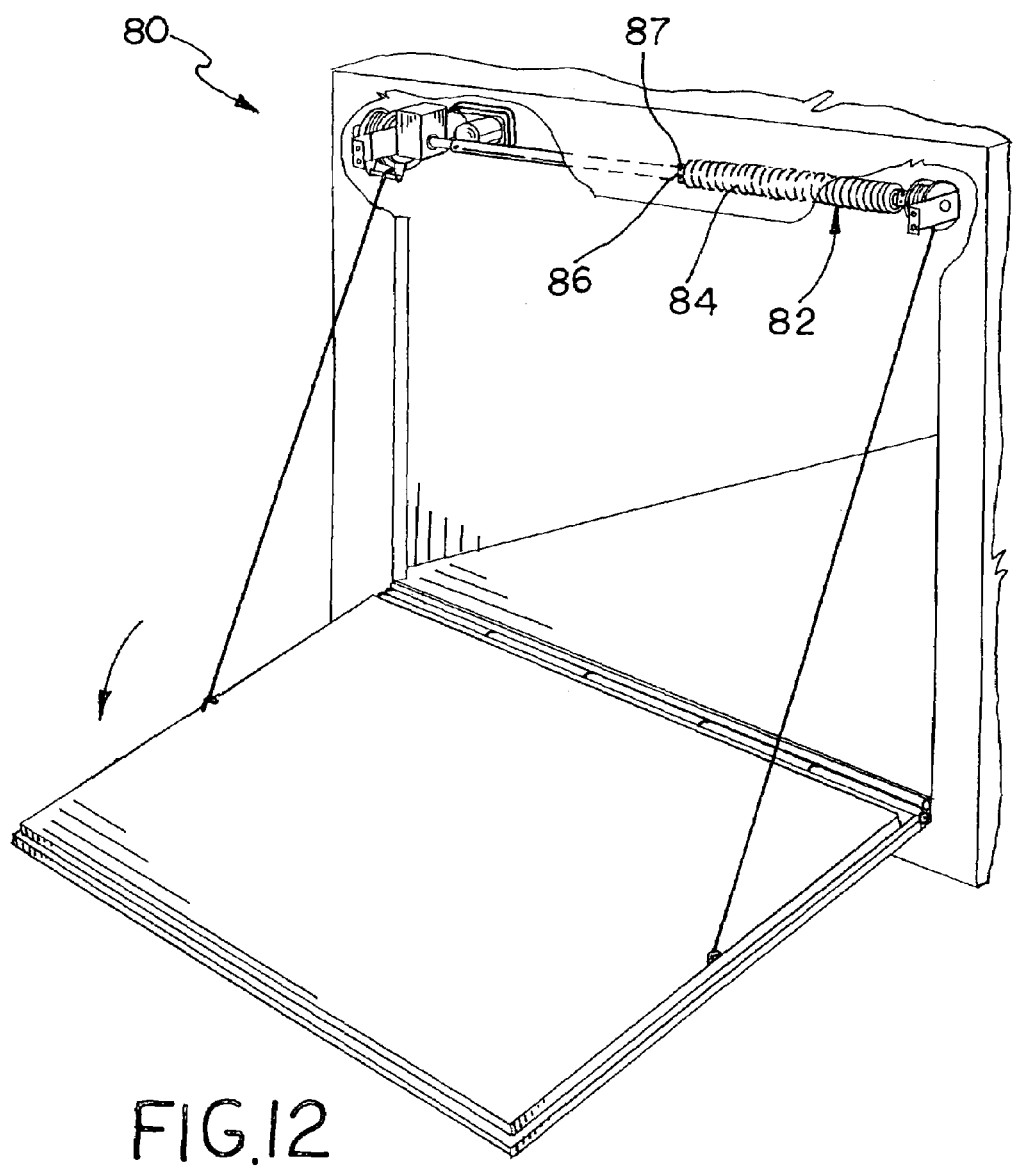
FIG. 12 is a perspective view of a third embodiment of the ramp door lift of this invention used in a ramp door cargo trailer showing the ramp door in the open position with portions of the trailer cutaway.

FIG. 12 illustrates another embodiment of the lift assembly of this invention, which is generally designated as reference numeral 80. Lift assembly 80 is similar to lift assembly 10 of FIGS. 1-9, but adds a torsion spring counterbalance 82. Torsion spring counterbalances 82 are well known in the industry and are commonly used to assist in the raising and lowering of ramp doors in cargo trailer applications. Because the counterbalance provides additional lifting power, the counterbalance allows winch motors of lesser power to be used in the ramp door lifts.

Counterbalance 82 includes a torsion spring 84 coaxially mounted to the drive shaft. One end of spring 84 is connected to a mounting bracket. The other end of spring 84 is connected to a locking cone 86 coaxially mounted to the drive shaft. Locking cone 86 has a plurality of screws 87, which extend through threaded bores into frictional engagement with the drive shaft. Spring 84 is tensioned (wound) to impart torque on the drive shaft and cable spools by rotating locking cone 86 around the drive shaft. This torque generates the counterbalancing force on the cables required to counterbalance the weight of the ramp door as it is manually raised and lowered between its closed and opened positions.

When the ramp door is lifted toward its closed position, the drive shaft turns to wind the cable onto the spools. As the drive shaft turns to wind the cables, the coil springs around the drive shaft are unwound to progressively decrease the counterbalancing force as the door closes. When the ramp door is pulled downward toward its open position, the drive shaft turns to unwind the cables from the spools. As the drive shaft turns to unwind the cables, the coil springs around the drive shaft are wound to progressively increase the counterbalancing force as the ramp door opens.

FIGS. 13-19 illustrates additional embodiments of the powered ramp door lift of this invention that demonstrate different types of pusher mechanisms. Each of these pusher mechanisms exert the outward force on the door when the door is in its vertical closed position to move the door way from the end wall and overcome the rotational inertia of the ramp door. While several additional and alternative pusher mechanisms are illustrated and described herein, the scope and range of equivalents relating to the pusher mechanism are not limited to any particular embodiment thereof.

Figure 13:
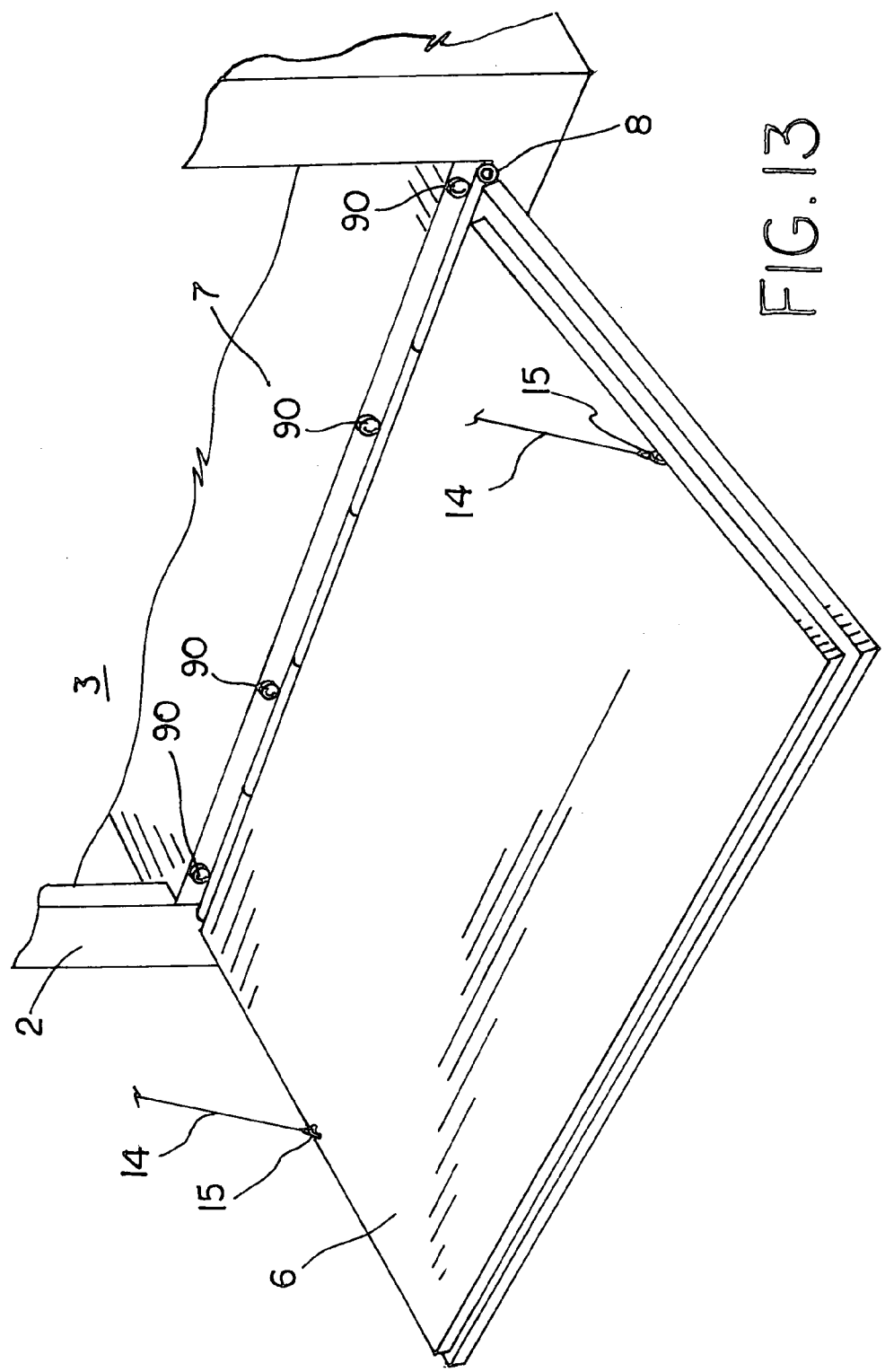
FIG. 13 is a partial perspective view of second embodiment of the pusher mechanism used in the ramp door lift of this invention.

FIG. 13 illustrates another embodiment of the lift assembly of this invention, where the resilient tubing pusher of Lift 10 is replaced by a plurality of resilient grommets 90 mounted to the edge of trailer floor 7. Grommets 90 are constructed of an elastic material, such as rubber, neoprene or similar material having the resilient memory to exert the pushing force on ramp door 6.

Figure 14:
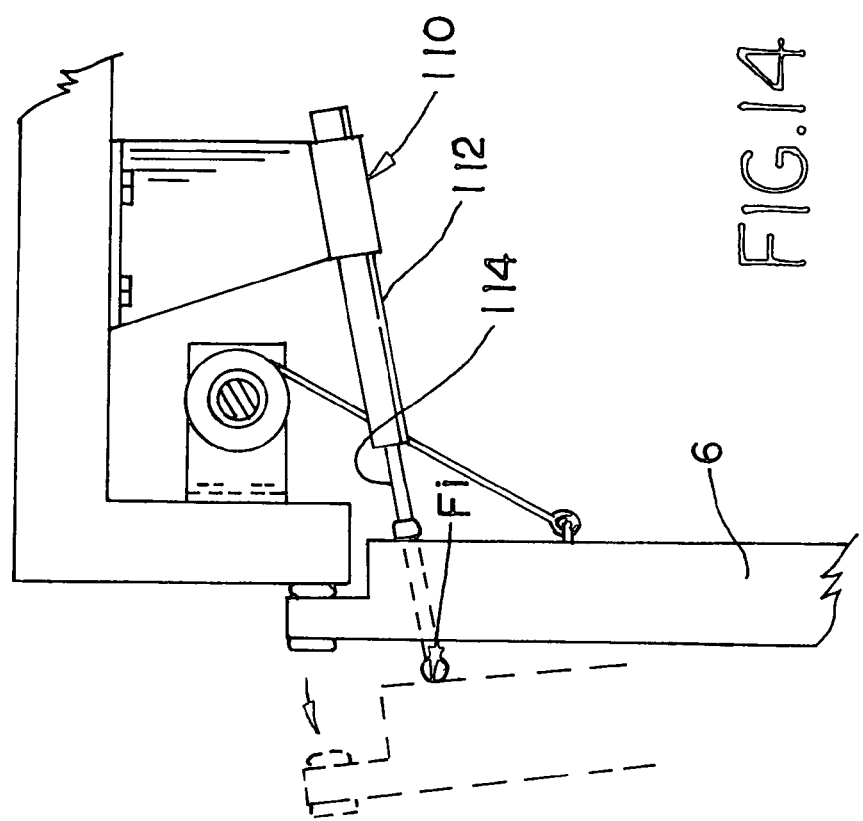
FIG. 14 is a partial side view of third embodiment of the pusher mechanism used in the ramp door lift of this invention.

FIG. 14 illustrates another embodiment of the lift assembly of this invention, which uses a header mounted gas piston pusher 110. Pusher 110 is mounted within trailer end wall 2 at an intermediate point between the trailer floor and header. Gas piston 110 includes a cylinder 112 and an extensible piston rod 114, which directly engages ramp door 6.

Figure 15:
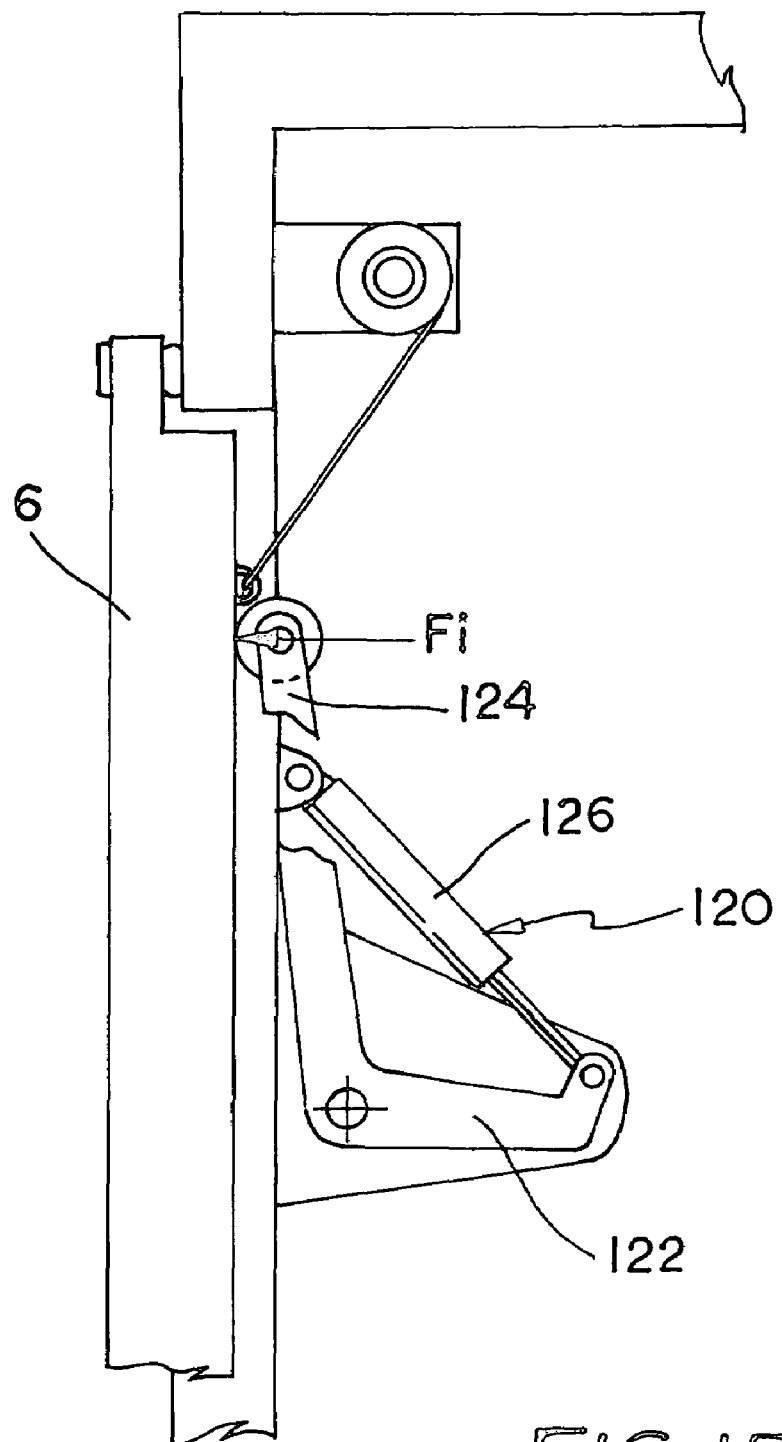
FIG. 15 is a partial side perspective view of fourth embodiment of the pusher mechanism used in the ramp door lift of this invention showing the pusher arm retracted.
Figure 16:
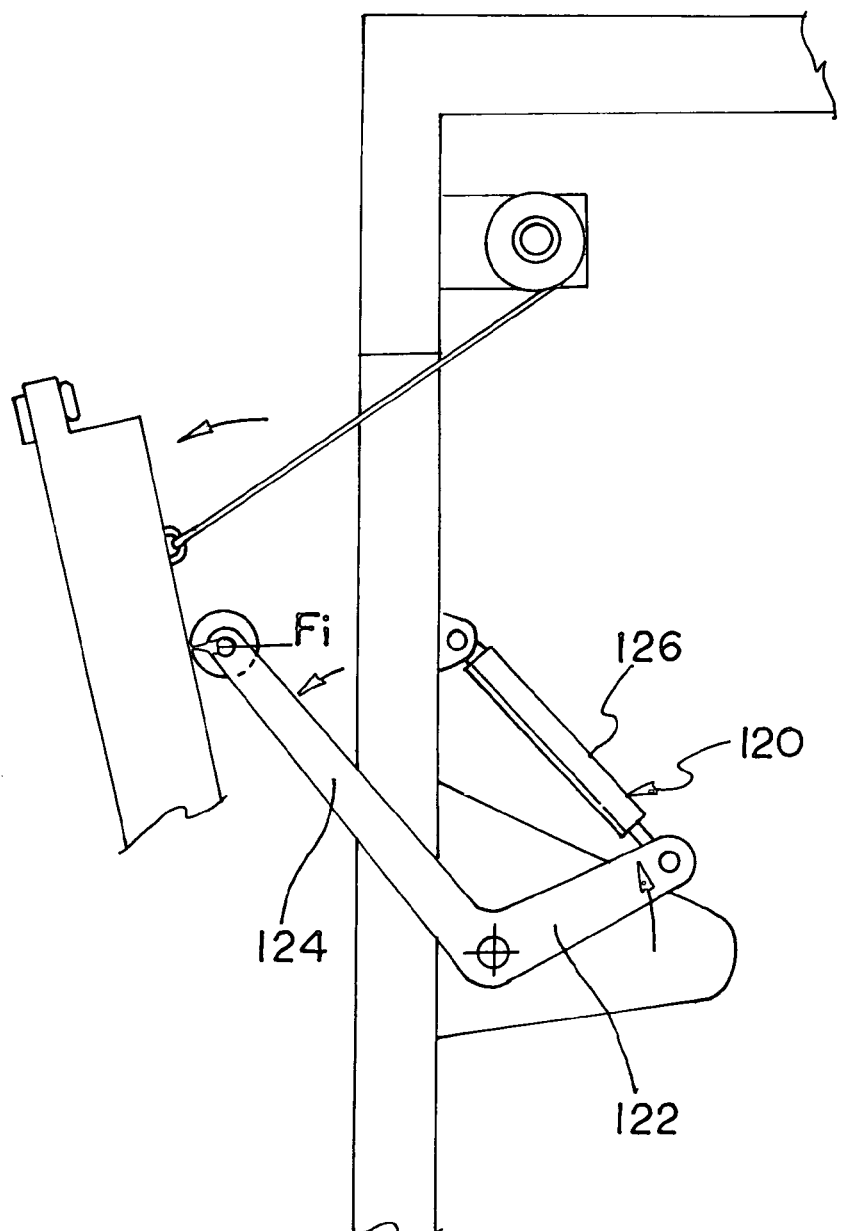
FIG. 16 is a partial side perspective view of fourth embodiment of the pusher mechanism used in the ramp door lift of this invention showing the pusher arm extended.

FIGS. 15 and 16 illustrate another embodiment of the lift assembly of this invention, which uses a side mounted linkage arm pusher 120. A linkage member 122 connects a lever arm 124 to another gas piston 126, which allows the end of the lever arm 124 to engage ramp door 6.

Figure 17:
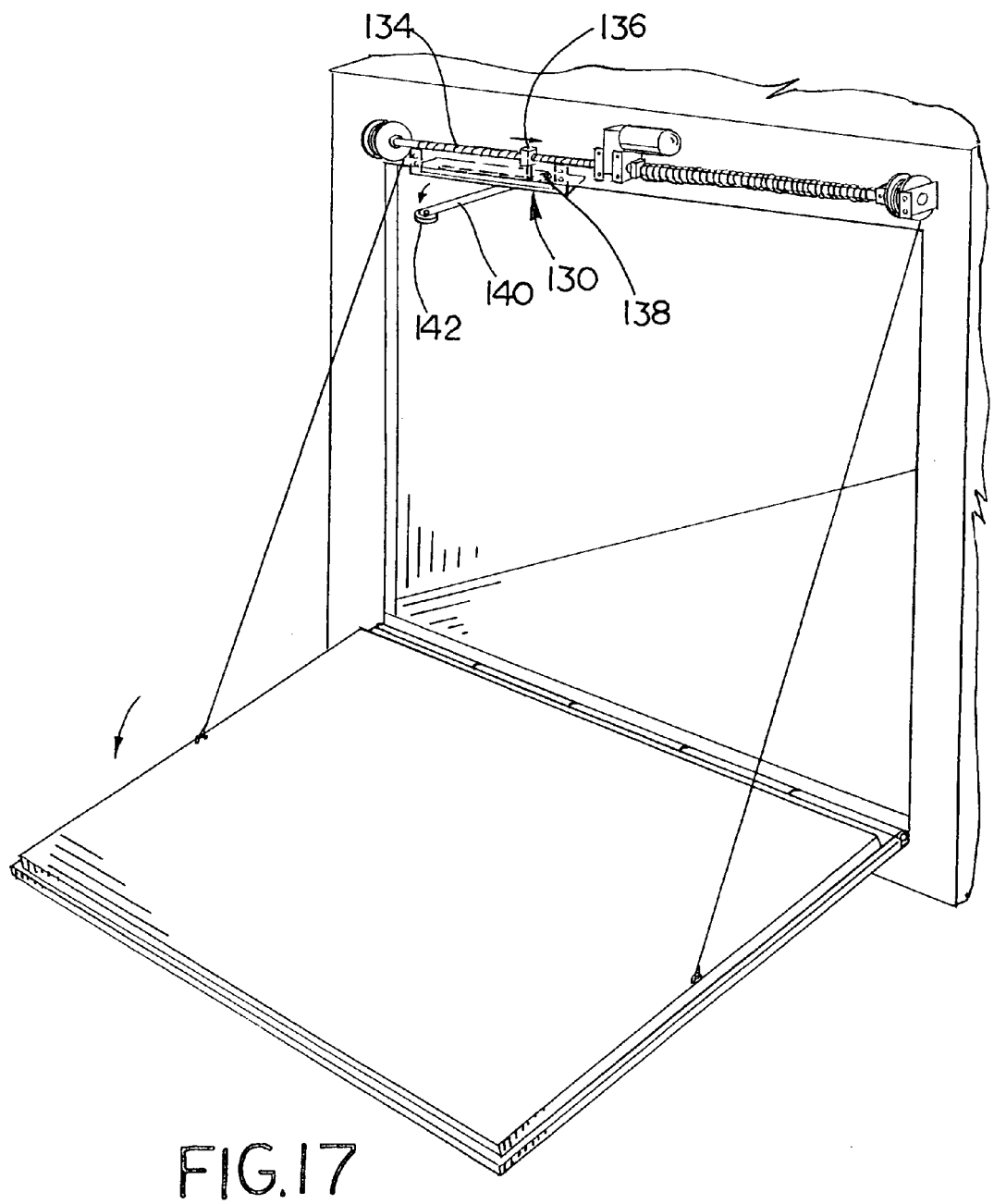
FIG. 17 is a partial perspective view of fifth embodiment of the pusher mechanism used in the ramp door lift of this invention.

FIGS. 17-19 illustrate another embodiment of the lift assembly of this invention, which employs a header mounted scissor arm pusher 130. In this embodiment, the winch assembly 132 is mounted in the center of trailer header. Two axially aligned drive shafts 134 and 135 extend from the gearbox of winch assembly 132 to which spools are fixed. Again, a torsion spring counterbalance is mounted over drive shaft 135. Drive shaft 134 is threaded to receive a traveler block 136. A flat guide plate 138 is mounted to trailer header 4 and suspended beyond drive shaft 134. Guide plate 138 has an elongated slot 139, which acts as a track for traveler block 136. A long lever or "pusher" arm 140 is pivotally mounted to guide plate 138 for reciprocal movement between a retracted position and an extended position. Pusher arm 140 has an elongated longitudinal slot 141. One end of pusher arm 140 is pivotally fixed to guide plate 138 and the other end terminates in a bumper wheel 142, which engages ramp door 6. As shown, a guide rod 137 extends from traveler block 136 through guide slot 139 and pusher slot 141. When winch assembly 132 turns drive shaft 134, traveler block 136 moves along the length of drive shaft 134 to swing pusher arm 140 between its retracted position and its extended position. When pusher arm 140 extends, bumper wheel 142 engages ramp door 6 to urge the ramp door away from trailer end wall 2.

The various powered ramp door lifts embodying the teaching of the present invention as illustrated in the drawing and described herein are not intended to be exhaustive or to limit the invention to the precise form disclosed. They are presented to explain the invention so that others skilled in the art might utilize its teachings. The embodiment of the present invention may be modified within the scope of the following claims.

We claim:

1. In a cargo trailer having an opening in a wall and a ramp door hinged to the wall adjacent the bottom of the opening so as to permit upward pivotal movement of the ramp door between an open position and a closed position, an apparatus for moving the ramp door between the open position and the closed position, the apparatus comprising:
an elongated flexible member connected to the ramp door;
winch assembly for winding and unwinding the flexible member whereby the winch applies a tension force to the flexible member to move the ramp door between its open and closed positions; and
pusher means for initially moving the ramp door outward from the trailer opening from the closed position toward the open position against the tension of the winch assembly.

2. The apparatus of claim 1 wherein the winch assembly includes a spool around which the flexible member is wound and a motor operatively connected to the spool for rotating the spool.

3. The apparatus of claim 1 and means operatively associated with the winch assembly for sensing the tension in the flexible member and terminating the operation of the winch assembly when the flexible member is slack.

4. The Apparatus of claim 1 and a spring counterbalance operating in association with the winch assembly for applying force to the flexible member to at least in part to counterbalance the weight of the ramp door and thereby facilitate movement of the ramp door between its open position and closed position.

5. The apparatus of claim 1 wherein the flexible member includes means for detachably connecting one end of the flexible member to the ramp door.

6. The apparatus of claim 1 wherein the pusher means is mounted between the ramp door and the bottom of the opening.

7. The apparatus of claim 1 wherein the pusher means includes a length of resilient tubing mounted between the ramp door and the bottom of the opening so that the tubing is compressed between the ramp door and bottom of the opening when the ramp door is in the closed position.

8. The apparatus of claim 1 wherein the pusher means includes an elongated contact part extensibly mounted to the trailer wall adjacent the opening for engaging the ramp door when the ramp door is in its closed position and means for biasing the contact part against the ram door when in its closed position.

9. The apparatus of claim 1 wherein the pusher means includes a resilient grommet mounted between the ramp door and the bottom of the opening so that the grommet is compressed between the ramp door and bottom of the opening when the ramp door is in the closed position.

10. The apparatus of claim 1 wherein the flexible member is a cable.

11. The apparatus of claim 1 wherein the flexible member is a strap.

12. In a cargo trailer having an opening in a wall and a ramp door hinged to the wall adjacent the bottom of the opening so as to permit upward pivotal movement of the ramp door between an open position and a closed position, an apparatus for moving the ramp door between the open position and the closed position, the apparatus comprising:

a cable connected to the ramp door;

winch assembly for winding and unwinding the cable whereby the winch applies a tension force to the cable to move the ramp door between its open and closed positions;

spring counterbalance operating in association with the winch assembly for applying force to the cable to at least in part counterbalance the weight of the ramp door and thereby facilitate movement of the ramp door between its open position and closed position; and pusher means for initially moveing the ramp door outward from the trailer opening from the closed position toward the open position against the tension of the winch assembly.

13. The apparatus of claim 12 wherein the winch assembly includes a spool around which the cable is wound and a motor operatively connected to the spool for rotating the spool.

14. The apparatus of claim 12 and means operatively associated with the winch assembly for sensing the tension in the cables and terminating the operation of the winch assembly when the cables are slack.

15. The apparatus of claim 12 wherein the cable includes means for detachably connecting one end of the cable to the ramp door.

16. The apparatus of claim 12 wherein the pusher means is mounted between the ramp door and the bottom of the opening.

17. The apparatus of claim 12 wherein the pusher means includes a length of resilient tubing mounted between the ramp door and the bottom of the opening so that the tubing is compressed between the ramp door and bottom of the opening when the ramp door is in the closed position.

18. The apparatus of claim 12 wherein the pusher means includes an elongated contact part extensibly mounted to the trailer wall adjacent the opening for engaging the ramp door when the ramp door is in its closed position and means for biasing the contact part against the ramp door when in its closed position.

19. In a cargo trailer having an opening in a wall and a ramp door hinged to the wall adjacent the bottom of the opening so as to permit upward pivotal movement of the ramp door between an open position and a closed position, an apparatus for moving the ramp door between the open position and the closed position, the apparatus comprising:

an elongated strap connected to the ramp door;

winch assembly for winding and unwinding the strap whereby the winch applies a tension force to the strap to move the ramp door between its open and closed positions; and pusher means for initially moving the ramp door outward from the trailer opening from the closed position toward the open position against the tension of the winch assembly.

20. The apparatus of claim 19 wherein the winch assembly includes a spool around which the strap is wound and a motor operatively connected to the spool for rotating the spool.

21. The apparatus of claim 19 and means operatively associated with the winch assembly for sensing the tension in the straps and terminating the operation of the winch assembly when the straps are slack.

22. The apparatus of claim 19 wherein the strap includes means for detachably connecting one end of the strap to the ramp door.

23. The apparatus of claim 19 wherein the pusher means is mounted between the ramp door and the bottom of the opening.

24. The apparatus of claim 19 wherein the pusher means includes a length of resilient tubing mounted between the ramp door and the bottom of the opening so that the tubing is compressed between the ramp door and bottom of the opening when the ramp door is in the closed position.

25. The apparatus of claim 19 wherein the pusher means includes an elongated contact part extensibly mounted to the trailer wall adjacent the opening for engaging the ramp door when the ramp door is in its closed position and means for biasing the contact part against the ramp door when in its closed position.

* * * * *